Aug. 12, 1924.
H. P. KRAFT
1,504,250
QUICK ACTING RIM NUT OR THE LIKE
Filed Feb. 24, 1921
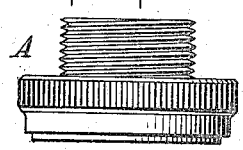
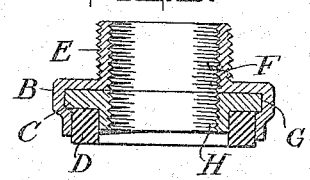
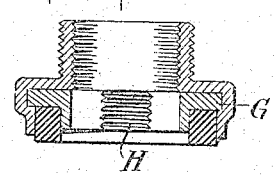
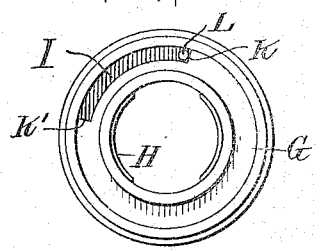
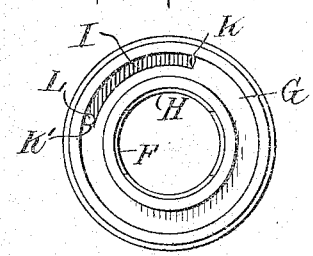
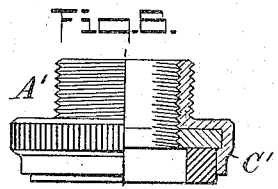
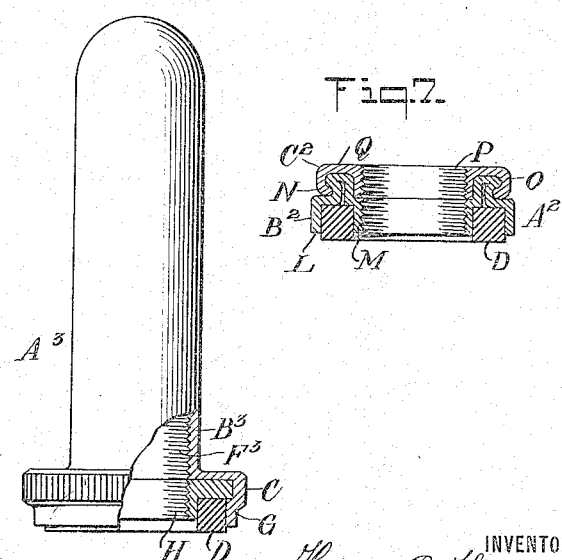
INVENTOR
Henry P. Kraft,
BY
ATTORNEYS Patented Aug. 12, 1924.

1,504,250

UNITED STATES PATENT OFFICE.

HENRY P. KRAFT, OF RIDGEWOOD, NEW JERSEY.

QUICK-ACTING RIM NUT OR THE LIKE.

Application filed February 24, 1921. Serial No. 447,490.

*To all whom it may concern:*

Be it known that I, HENRY P. KRAFT, a citizen of the United States of America, residing in Ridgewood, in the county of Bergen and State of New Jersey, have invented certain new and useful Improvements in Quick-Acting Rim Nuts or the like, of which the following is a specification.

This invention relates to rim nuts for tire valves, or the like, and aims to provide certain improvements therein.

The invention is applicable to quick acting nuts in general, although the preferred forms illustrated are particularly adapted for use in connection with dust caps and pneumatic tire valve stems.

Nuts for use on pneumatic valve stems are usually provided with an internal recess for receiving a packing washer and an internal thread adapted to engage the screw threads on the valve shell. When adapted to receive a dust cap, the nut is usually formed with an extension on its outer side. In this type of nut, considerable time is required to thread the nut down over the length of the valve shell, which usually protrudes through the felly for several inches. Furthermore, this threading operation usually taxes the patience of the individual, especially when the screw threads on the valve are nicked or rusted. According to the present invention, these disadvantages are overcome. According to the present invention, there is provided a nut formed of two parts, each having a mutilated thread, and one part being associated with or carried by the other. One of these parts is provided with a finger gripping portion and preferably with an internal recess for receiving a packing washer. The two parts of the nut are so arranged that the mutilated threads therein may be brought out of alignment, so that the equivalent of a continuous thread is presented, whereby the nut may be threaded onto the valve shell, or the mutilated threads may be brought into alignment for facilitating the rapid application or removal of the nut from the valve shell, by merely pushing or pulling the nut over the threaded shell, the threaded parts, in these operations, sliding along the flats on the shell. The two-part nut preferably has interengaging means for limiting the relative rotation of the parts, during which movement the threads are brought fully into or out of alignment.

Certain other features of invention are also provided.

Referring to the drawings, which illustrate several forms of the invention:

Figure 1 is a side elevation of one form of the invention.

Fig. 2 is a longitudinal section of the nut, showing the threaded portions in alignment.

Fig. 3 is a similar view, showing the position of the parts when one of the nut portions has been rotated 90 degrees.

Fig. 4 is a bottom plan view of the nut shown in Fig. 2, with the packing washer omitted.

Fig. 5 is a similar view of Fig. 3.

Fig. 6 is a view, partly in side elevation and partly in section, of a modified form of the invention.

Fig. 7 is a sectional view of another modified form of the invention.

Fig. 8 is a side elevation of a dust cap, with a part being broken away, showing the application of the invention thereto.

Referring to Figs. 1 to 5 of the drawings, let A indicate the nut, as a whole, which is preferably formed with a body portion B, an insert portion C, and a packing gasket D. The body portion B, which may be made of either sheet or drawn metal, is preferably formed with an externally threaded bushing E for accommodating a dust cap. The bushing may also be provided with mutilated internal threads F, for attachment to a valve stem, or the like. The threads are preferably arranged on the opposite sides of the bushing, or 180 degrees apart, while the unthreaded portion is of sufficient diameter to pass over the threads on the valve stem to which it is to be applied.

Within the body portion B, is swivelled the insert portion or secondary nut C. This secondary nut preferably comprises a base member G and a sleeve H, provided with an internal mutilated thread of the same diameter and pitch as the threads F on the bushing. The swivelled insert or secondary nut member may be held within the body member B in any desired manner, and, as shown, is held therein by beading a part of body member B around the edge of the member G. The secondary nut member has a portion of its base cut away, as shown at I, which cut away portion, as herein shown, is equal to approximately 90 degrees. This cut away portion I results in the formation of shoulders K and K', which limit the relative rotation between the parts B and C, by contacting with a stop element which, in the construction shown, is a pin L, mounted in the body B. This stop element may be made in any known or desired manner, such as by indenting a portion of the body member, either on the milled gripping portion, or the top flange thereof. The shoulders K and K' are located at points sufficiently spaced apart to permit of said mutilated threaded portions F and H being brought into or out of alignment, and the relative positions of the stop L and the shoulders K and K' provides for holding the parts in said positions. The body member preferably carries the packing washer D, which may be made of leather, rubber, or any other similar substance, and is held within the recess in the body member formed by flange H and the lower edge of the body member B.

In Fig. 6 of the drawings, I have shown a modification of the invention, wherein a flat ring insert, or secondary nut member C', is provided, instead of the flanged member shown in Figs. 2 and 3. In this modification, the cost is considerably lessened, by both a saving in metal and in the number of manufacturing operations. Otherwise, this form is quite similar to that already described.

In Fig. 7, I have shown another modification of the invention, which is made entirely of sheet metal. In this form, the nut member is designated generally by the reference character $A^2$, and consists of the body member $B^2$, secondary nut $C^2$, and packing washer D. The body portion is made by stamping a sheet metal blank back upon itself, to form the end flanges L and M and the intermediate flange N. The flange M is provided with mutilated threads, as previously described. Upon the body portion $B^2$ is mounted the secondary nut member $C^2$, which, as shown, is stamped from sheet metal, and consists of the end flanges O and P and the intermediate portion Q. The flange P is provided with internal mutilated threads, which may be brought into and out of alignment with the threads on the flange M. The members $B^2$ and $C^2$ may be held together against separation in any known manner, as, for example, by spinning the edge of flange O under the flange N. Means for providing the limited relative rotary movement between the two members, similar to that shown in Figs. 2 to 5, may be employed. Between the flanges of the body member, there may be carried the usual packing washer D. The flanges L and O are preferably formed with finger gripping surfaces, so that one of said members may be held stationary while the other is turned to bring both members into engagement for unitary rotation.

In Fig. 8, I have shown an embodiment of the invention, as applied to a dust cap. In said figure, $A^3$ indicates the cap as a whole, $B^3$ the lower end thereof, C the secondary unit within the cap, and D the ordinary packing washer. The upper portion of cap B may be of any preferred construction, while the lower or foot portion is provided, on its inner surface, with the mutilated threads $F^3$, quite similar to the threads F, in Figs. 2 and 3, while the remainder of the foot portion may be identical with the foot portion of the body B, in Figs. 2 and 3. A further detailed explanation of this modification is, therefore, thought unnecessary.

In the use and operation of the quick detachable nut, herein shown and described, the two nut parts are first arranged as shown in Fig. 2, and, in view of the alignment of the mutilated threads on both parts, the nut may be slid down over a bolt or valve stem having opposite flat sides to the stop member, which, in the case of a valve stem, is the wheel felly. When the washer D contacts the felly, sufficient frictional engagement is set up between it, the felly, and the secondary nut, to prevent the nut from turning when the body member is turned. However, after the body member has been turned through an appropriate arc, the stop L will engage the shoulder K', and a further application of turning force will overcome the frictional engagement set up by the gasket and cause both nut members to turn as a unit. It will here be noted that, when the stop member L contacts the shoulder K', as shown in Fig. 3, the arrangement of the mutilated threads on the two parts is such as to present the equivalent of a continuous threaded engagement between the valve stem and nut. The turning of the two parts of the nut, as a unit, permits of the absolute tightening of the nut against the felly. When it is desired to remove the nut, the turning of the cap member in the reverse direction brings the stop L against the shoulder K, the mutilated threads are thus brought into alignment, and the nut may be slid off the stem.

In some embodiments of the invention, it may be desirable to do away with the washer D, in which case the secondary nut member may have a portion thereof formed with a finger gripping or wrench engaging surface, by means of which said member may be temporarily held stationary while the other is turned to bring both members into engagement for unitary rotation.

It is obvious that, when this type of nut is incorporated in a dust cap, as shown in Fig. 8, an efficient, quick detachable dust cap is provided.

While I have shown and described various embodiments of my invention, it will be understood that I do not wish to be limited thereto, as various changes may be made therein, without departing from the spirit of the invention.

What is claimed is:

1. A quick-acting nut, or the like, comprising two associated members, each having mutilated threads, the thread portions being adapted to be brought into and out of alignment by a relative rotation of said members and a pin and groove connection wholly within said members for limiting the relative rotary movement therebetween.

2. A quick acting nut, or the like, having a body portion and an exteriorly threaded extension adapted to receive a dust cap or the like, said nut having an opening completely through it, part of said opening being formed with a mutilated screw thread, and a second member having a mutilated thread associated with the body portion, and adapted to have its threads brought into and out of alignment with the threads on the body portion by a relative rotary movement between said parts, and means wholly within the nut for positively limiting said rotary movement of the members.

3. A quick acting nut, or the like, having a body portion and an exteriorly threaded extension adapted to receive a dust cap or the like, said nut having an opening completely through it, part of said opening being formed with a mutilated screw thread, and a second member having a mutilated thread associated with the body portion, and adapted to have its threads brought into and out of alignment with the threads on the body portion by a relative rotary movement between said parts, and means for positively limiting said rotary movement of the members, said means consisting of a pin and groove connection wholly within the nut.

4. A quick acting nut or the like, comprising a primary member and a secondary member, each of said members having a cylindrical portion provided with mutilated threads and a lateral flange, the lateral flange of the primary member being beaded over the flange on the secondary member to provided a swiveled connection between said members.

5. A quick acting nut or the like, comprising a primary member and a secondary member, each of said members having a cylindrical portion provided with mutilated threads and a lateral flange, the lateral flange of the primary member being beaded over the flange on the secondary member to provide a swiveled connection between said members, said beaded portion of the flange providing a suitable manipulating portion for the nut and means limiting the relative rotation between the members.

6. A quick acting nut or the like, comprising a primary member and a secondary member, each of said members having mutilated thread portions adapted to be brought into and out of alignment, the secondary member being swiveled in the base of the primary member and means enclosed within the base of the primary member for limiting the relative rotation between the members.

In witness whereof, I have hereunto signed my name.

HENRY P. KRAFT.